No. 819,715. PATENTED MAY 8, 1906.
F. W. BENNETT.
CALCULATOR.
APPLICATION FILED JAN. 18, 1905.

WITNESSES:
L. Gifford Handy
Isaac B. Owens.

INVENTOR
Frank W. Bennett
BY
ATTORNEYS

No. 819,715. PATENTED MAY 8, 1906.
F. W. BENNETT.
CALCULATOR.
APPLICATION FILED JAN. 18, 1905.

WITNESSES:

INVENTOR
Frank W. Bennett
BY
ATTORNEYS

No. 819,715. PATENTED MAY 8, 1906.
F. W. BENNETT.
CALCULATOR.
APPLICATION FILED JAN. 18, 1905.

WITNESSES:

INVENTOR
Frank W. Bennett
BY
ATTORNEYS

UNITED STATES PATENT OFFICE.

FRANK W. BENNETT, OF WATERBURY, CONNECTICUT.

CALCULATOR.

No. 819,715.   Specification of Letters Patent.   Patented May 8, 1906.

Application filed January 18, 1905. Serial No. 241,558.

*To all whom it may concern:*

Be it known that I, FRANK W. BENNETT, a citizen of the United States, and a resident of Waterbury, in the county of New Haven and State of Connecticut, have invented a new and Improved Calculator, of which the following is a full, clear, and exact description.

The invention relates to an apparatus by means of which mathematical calculations—such as addition, multiplication, subtraction, and division—may be performed mechanically.

The underlying object of the invention is to simplify the parts of the machine and to enable the calculations to be performed by less movements and in shorter time than heretofore. In attaining this end I provide a keyboard composed of nine keys, with which are arranged any desired number of indicating-wheels, these wheels representing, respectively, units, tens, hundreds, thousands, &c., and devices are provided by means of which any one of these keys may be connected with the desired indicating-wheel, so that a certain key may by the adjustment of these devices be struck to indicate one unit, one ten, or one hundred, as may be desired. This, it will be observed, enables me to perform all of the operations necessary in the machine by means of only nine keys. I also provide devices for cutting out of action means for transmitting from one indicating-wheel to the other, these devices being utilized in certain calculations, as will fully appear hereinafter.

Reference is had to the accompanying drawings, which illustrate, as an example, the preferred embodiment of my invention, and in which drawings like characters of reference indicate like parts, and in which—

The apparatus is provided with a casing 15, which may be of any desired form and which is provided at its top with observation-openings 15ª to permit of observation of the indicating-wheels, the openings being one for each wheel, as shown. This casing 15 contains all of the operative parts excepting the various keys and the thumb-wheel for resetting the indicating devices.

Figure 1:
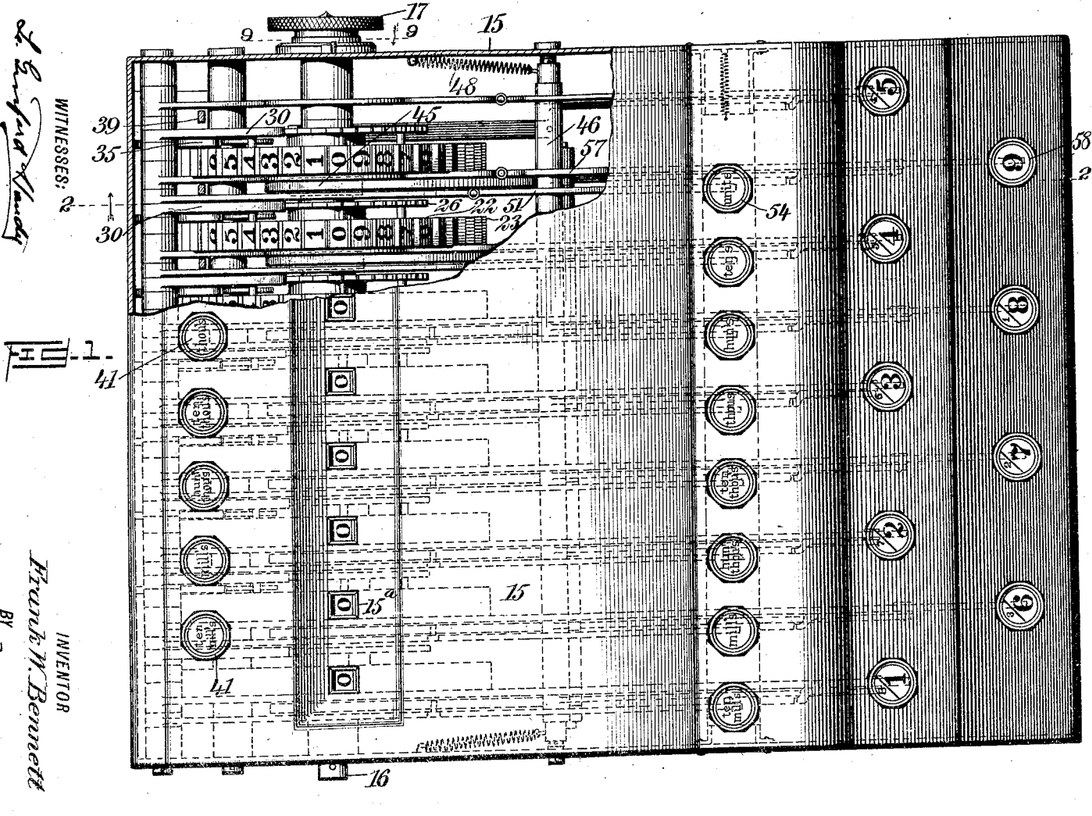
Figure 1 is a plan view of the apparatus with parts broken away to disclose the indicating-wheels and adjacent parts.
Figure 7:
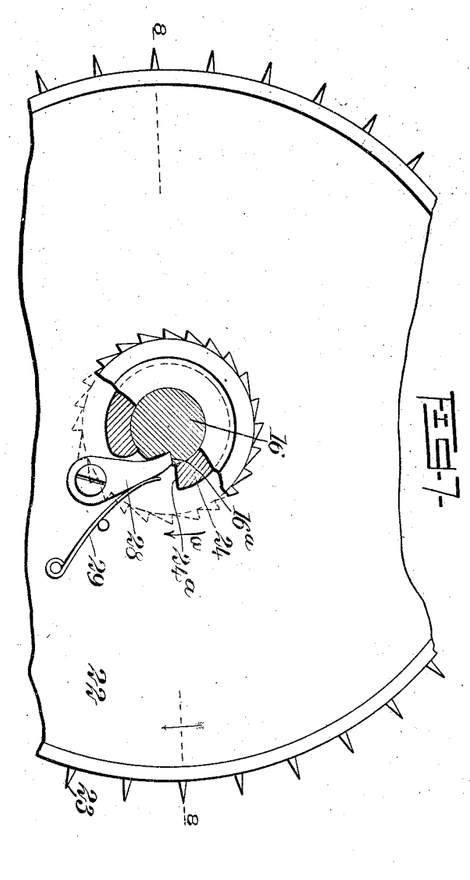
Fig. 7 is a fragmentary elevation of one of the indicating-wheels, showing the shaft in section on the line 7 7 in Fig. 3 and illustrating one of the pawls which coact with the shaft to return the indicating-wheels to zero.
Figure 8:
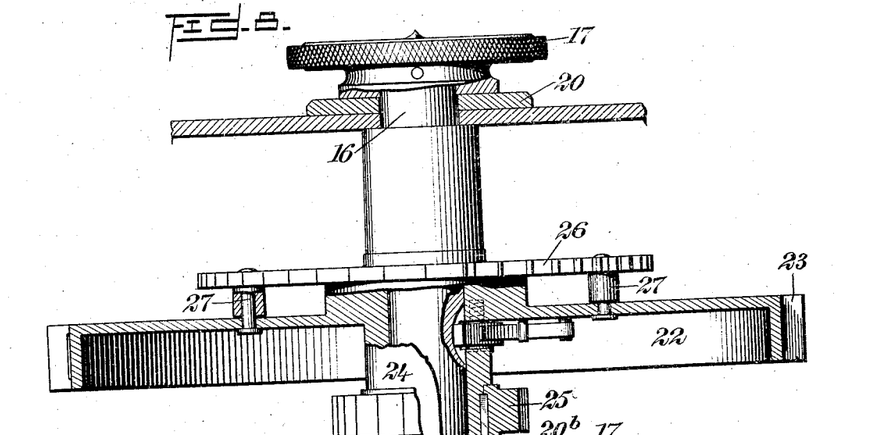
Fig. 8 is a sectional plan of the parts on the line 8 8 of Fig. 7, Fig. 8 also showing one of the ratchets attached to the indicating-wheels to turn one from the other and the thumb-wheel on the main shaft by means of which the indicating-wheels are returned to zero.
Figure 9:
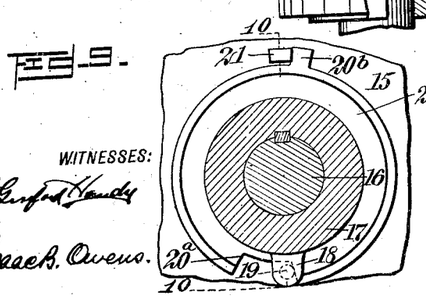
Fig. 9 is a sectional elevation on the line 9 9 of Fig. 1.
Figure 10:
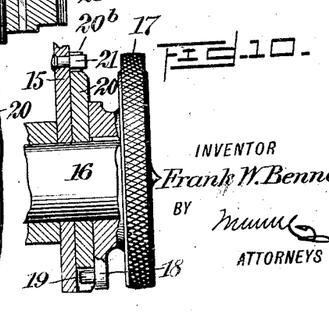
Fig. 10 is a fragmentary longitudinal section on the line 10 10 of Fig. 9.

Revolubly mounted in the casing 15 is a main shaft 16, which extends transversely through the casing and is provided at one end with a thumb-wheel 17, keyed to the shaft. The thumb-wheel has a projecting lug 18, carrying a pin 19, this pin fitting in a peripheral recess 20ª, formed in a disk 20, mounted loosely on the shaft 16 and lying against the outside of the casing 15. Said disk 20 has a lug 20ᵇ projecting beyond its periphery at a point opposite its recess 20ª, and coacting with this lug is a stud 21, attached to the casing 15. These devices serve to control the rotating movement of the shaft 16 to reset the indicating-wheel in a manner which will be fully set forth hereinafter. 22 indicates the indicating wheels or devices. These are provided with broad peripheries having regularly-spaced outwardly-projecting teeth 23, and between which teeth are produced numbers running from zero to nine, as shown in Fig. 1. According to the structure here shown each indicating-wheel is provided with four groups of numbers from zero to nine, said groups being arranged successively around the periphery of the wheels. The wheels 22 have hubs 24 loosely mounted on the shaft 16. Each hub 24 carries securely a small ratchet-wheel 25, and at the other side of the indicating-wheel a relatively large ratchet 26 is arranged, these ratchets being secured to the wheel by means of bolts 27. The bolts 27 perform, in addition to the function of holding the ratchets 26 in place, the function of actuating the means for transmitting from one indicating-wheel to the other, to carry, for instance, ten units over to the tens indicating-wheel, and since the construction here illustrated provides for four groups of numbers from zero to nine for each indicating-wheel it follows that there must be four of the projecting bolts 27. Each indicating-wheel also carries a pawl 28, pressed into active position by a spring 29. The pawls 28 project through openings 24ª in the hubs 24 and engage ratchet-like notches 16ª, formed on the shaft. The notches 16ª are one for each pawl 28 or indicating-wheel 22 and are arranged in longitudinal alinement on the shaft, so as to permit resetting or returning the indicating-wheels to zero. This is done by turning the shaft 16 in the direction of the arrow $a$ in Fig. 7 until all of the pawls 28 fall into their corresponding cavities 16ª and the indicating-wheels, moving with these pawls, reach the zero position, at which time the lug 20ᵇ of the disk 20 will strike the stop or stud 21, and further movement will be arrested. By reason of devices which will be hereinafter described the indicating-wheels 22 are permitted to rotate but in one direction, and the disk 20 and its immediately-coacting parts are provided to enable the shaft 16 to be returned idly to the starting-point prior to the operation of resetting the disk. The notch 20ª in the disk is elongated, as shown, and this is for the purpose of permitting the shaft 16 to take a full rotation or a slightly more than a full rotation during the resetting operation, thus insuring that all of the pawls 28 engage in their corresponding cavities 16ª.

Figure 2:
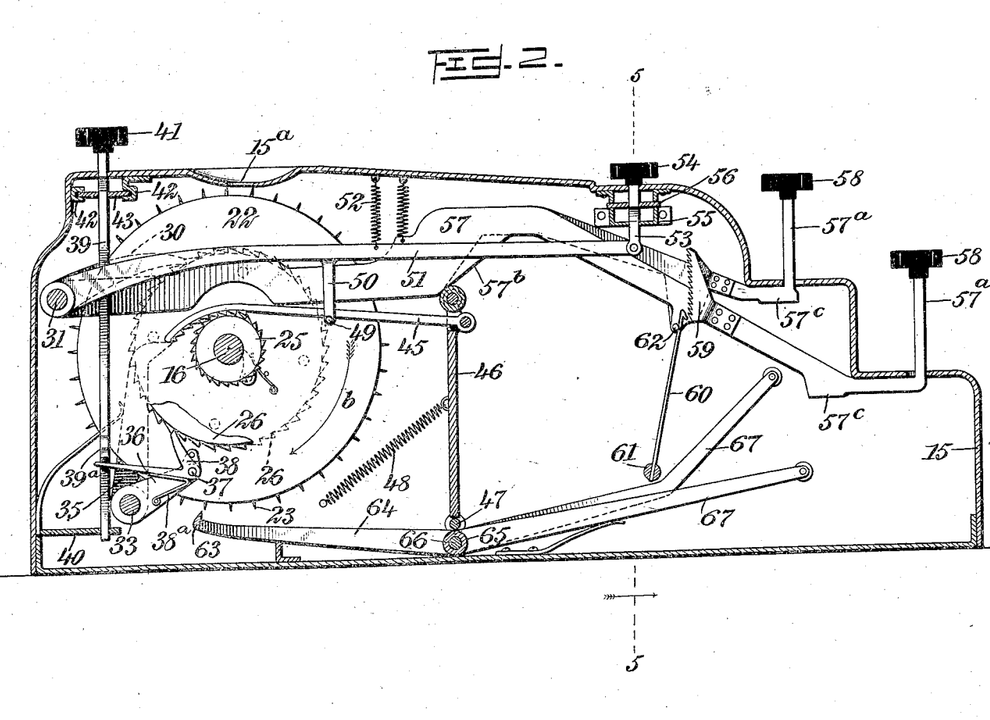
Fig. 2 is a vertical section on the line 2 2 of Fig. 1.
Figures 3, 4:
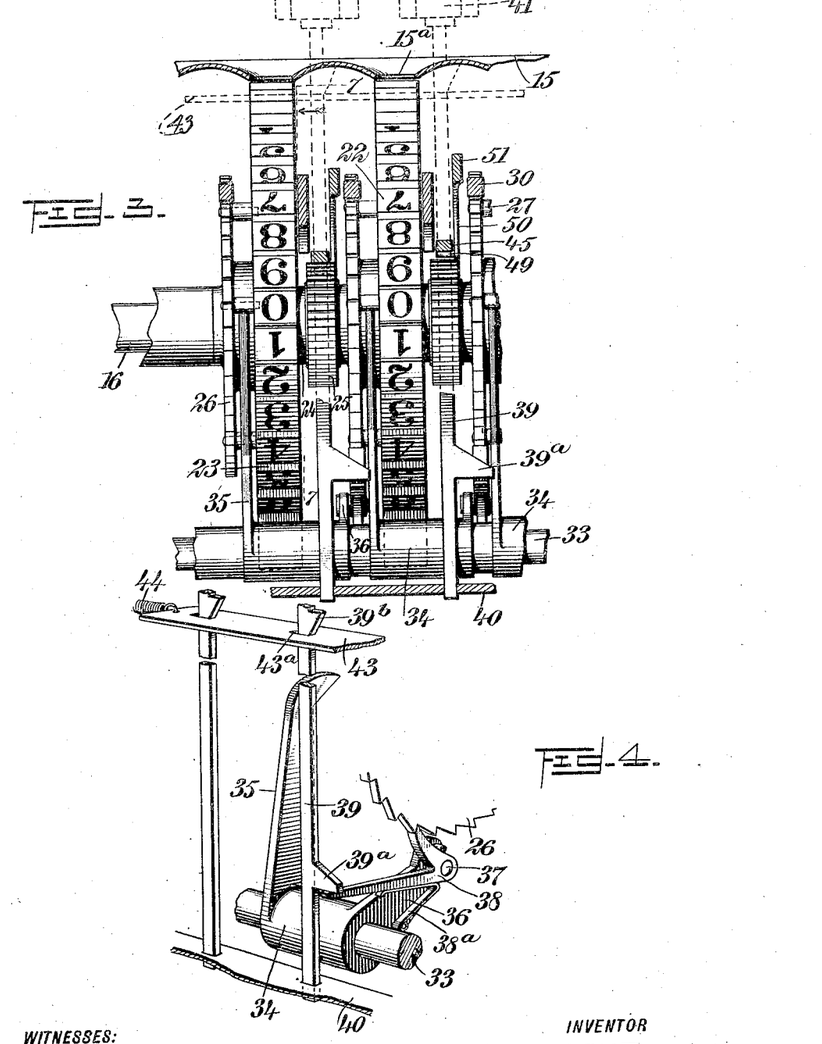
Fig. 3 is a fragmentary elevation with parts in section, showing the rear of two of the indicating-wheels and their adjacent parts.
Fig. 4 is a fragmentary perspective showing the device for transmitting from one indicating-wheel to the other and also the device for throwing these devices temporarily out of action.

The indicating-wheels are intended to turn only in the direction indicated by the arrow $b$ in Fig. 2, and to prevent backward movement I provide each ratchet 26 with a pawl 30. These pawls are mounted loosely on a shaft 31, which extends across the rear portion of the casing back of the indicating-wheels, the pawls lying by gravity on the upper portions of the ratchets, as shown in Figs. 1 and 2. Below the shaft 31 and slightly forward therefrom is a shaft 33, on which are loosely mounted a series of sleeves 34. Each sleeve is provided with an arm 35, and said arms reach upward and inward between the respective indicating-wheels 22 and their ratchets 26, so as to be engaged by the bolts 27, and therefore as the indicating-wheels rotate a rearward swinging movement will be imparted to the arms 35 each time that a bolt 27 engages the arms. The sleeves 34 will therefore turn on the shaft 33. Each sleeve 34 also carries an arm 36, these arms projecting forward, respectively, under the ratchets 26. Attached to each arm 36 is a pin 37, carrying an elbow-shaped dog 38. The dogs 38 are pressed into action by springs 38ª, and one arm of each dog engages its respective ratchet 26, as best shown in Figs. 2 and 4. The remaining arms of the dogs 38 project rearward under shoulders 39ª, formed on vertically-extending rods 39. The rods 39 are vertically movable and are carried at their lower ends in a rack 40, rigidly secured in the casing 15. At their upper end the rods 39 project through the top of the casing 15 and are provided with keys 41. On the under side of the top of the casing 15, at the rear thereof, two horizontally-disposed guides 42 are arranged. In these guides a slide 43 is mounted. Said slide is formed with openings 43ª therein, (best shown in Fig. 4,) and each rod 39 is provided with a tapering projection 39ᵇ, normally located above the slide. The rods 39 are held in their normal position (see Figs. 2 and 4) by means of the springs 38ª. Upon depressing one of the rods, however, the inclined part 39ᵇ thereof will engage the slide 43 and move the same longitudinally until the projection 39ᵇ passes below the slide, whereupon the slide under the action of a spring 44 will return to its normal position and lying over the projection 39ᵇ will hold the rod depressed. The parts remain in this position until a further rod 39 is depressed, whereupon a second movement is given to the slide 43, which results in the release of the rod 39 first depressed and in the catching of the other rod, holding this other or second rod depressed as was the first. It will be seen, therefore, that when one rod is depressed it is locked by the slide, and when the second rod is depressed the first rod is released and the second rod locked. Any one or all of the rods may be released at will by giving the slide 43ª manual movement contrary to the spring 44, for which purpose one end of the slide may be projected beyond the casing to admit of grasping the slide. Therefore as one of the indicating-wheels turns and as its movement continues until one of the bolts 27 strikes the corresponding arm 35 the sleeve 34 will be rocked, and through the action of the arm 36 the dog 38 will impart a movement to the ratchet 26 of the next adjacent indicating-wheel, and this indicating-wheel will be turned sufficiently to change its position one number, thus carrying, for example, ten units from the units-wheel over to the tens-wheel and causing the latter wheel to change, for example, from one to two. When it becomes necessary to arrest this operation, as is necessary in certain calculations, the key 41 corresponding to the indicating-wheel involved should be depressed, thus throwing the corresponding dog 38 out of operation and rendering the rocking of the sleeve 34 ineffective.

Mounted in position to engage each minor ratchet 25 is a toothed or ratchet bar 45. These bars have their toothed parts slightly curved, as shown in Fig. 2, so as to insure their correct engagement with their ratchets, and each bar is pivotally joined to a swinging plate or member 46. Said member is hingedly mounted on its lower edge, as indicated at 47, and is held rigidly, as shown in Fig. 2, by means of a retractile spring 48. The ratchet-bars 45 are held only disengaged from their ratchet, as shown at the right-hand side of Fig. 3, by means of pins 49, lying under the ratchet-bars and carried by arms 50, respectively, depending from key-levers 51. Said key-levers are mounted to swing around the shaft 31 and are held normally raised by retractile springs 52. The key-levers project forward and have bars 53 hinged thereto. Said bars project upward through the top of the casing and are provided with keys 54. The bars 53 project through a guide 55, similar in function to the guides 42, and they engage a slide 56, similar in function to the slide 43. Said bars are provided with shoulders or projections 53$^a$, similar to the projections 39$^b$ before described. When, therefore, any one of the keys 54 is depressed, it is locked in this depressed position and remains there until a second key is depressed, whereupon the first key is released and the second key is locked. Upon depressing any one of the key-levers 51 the ratchet-bar 45 corresponding thereto drops into active position, or, in other words, into engagement with the ratchet 45. (See Fig. 2 and the left-hand side of Fig. 3.) Now, therefore, upon depressing one of the keys 54 and allowing one of the corresponding ratchets 45 to drop, as described, upon the forward movement of the swinging member 46 the ratchet-bar will impart a turning movement to its corresponding indicating-wheel, and the extent of this movement will depend upon the extent of the outward motion of the swinging member 46—i. e., if a short movement be imparted to the member 46 the indicating-wheel will be given a short turning movement, and if the swinging member 46 be swung to the limit of its forward movement a maximum turning movement will be imparted to the turning wheel.

For so operating the swinging member 46 I provide main key-levers 57. Said levers are mounted to swing around the shaft 31 and extend forward to the front of the casing 15, where they are provided with vertical extensions 57$^a$, projecting through openings in the casing, and they are provided at their upper extremities with keys 58, bearing the major numbers from "1" to "9" and the minor numbers from "1" to "8," as shown in Fig. 1. Each main key-lever 57 is provided with a cam-surface 57$^b$, and these cam-surfaces have each a distinct profile, the angularity of which is in consonance with the value of the major number marked upon the key in connection with the main key-levers. For example, the main key-lever bearing the minor number "1" (see Fig. 1) has a cam 57$^b$ of the sharpest angularity, so that it imparts a minimum movement to the swinging member 46, and the main key-lever, the key of which bears the major number "9," has a cam 57$^b$ of the least angularity, so that it imparts a maximum movement to the swinging member 46. By these means I am able to impart to each indicating-wheel a movement precisely equivalent to the value of the key which is struck. It will also be observed that any one of the main keys 58 may be placed in connection with any one of the indicating-wheels to the exclusion of the other keys, and this through the operation of the keys 54 and their connected parts. Consequently to register nine units the key 54 related to the units indicating-wheel should be depressed and the main key 58 bearing the major number "9" should be depressed. Upon the depression of this main key the swinging member 46 will be moved outward and will carry with it all of the ratchet-bars 45; but since only the bar of the units indicating-wheel has been dropped into position this bar alone will be active, and the result is that nine units are registered on the units indicating-wheel. If it be desired to register nine thousand, the key 54 bearing the word "thousands" and related to the thousands indicating-wheel should be depressed. This will release the units-key 54 and its connected parts and will drop and lock into position the ratchet-bar 45 related to the thousands indicating-wheel. Then upon depressing the main key 58, bearing the major numeral "9," the number "9,000" will be registered by the operation of the parts as before explained.

Figures 5, 6:
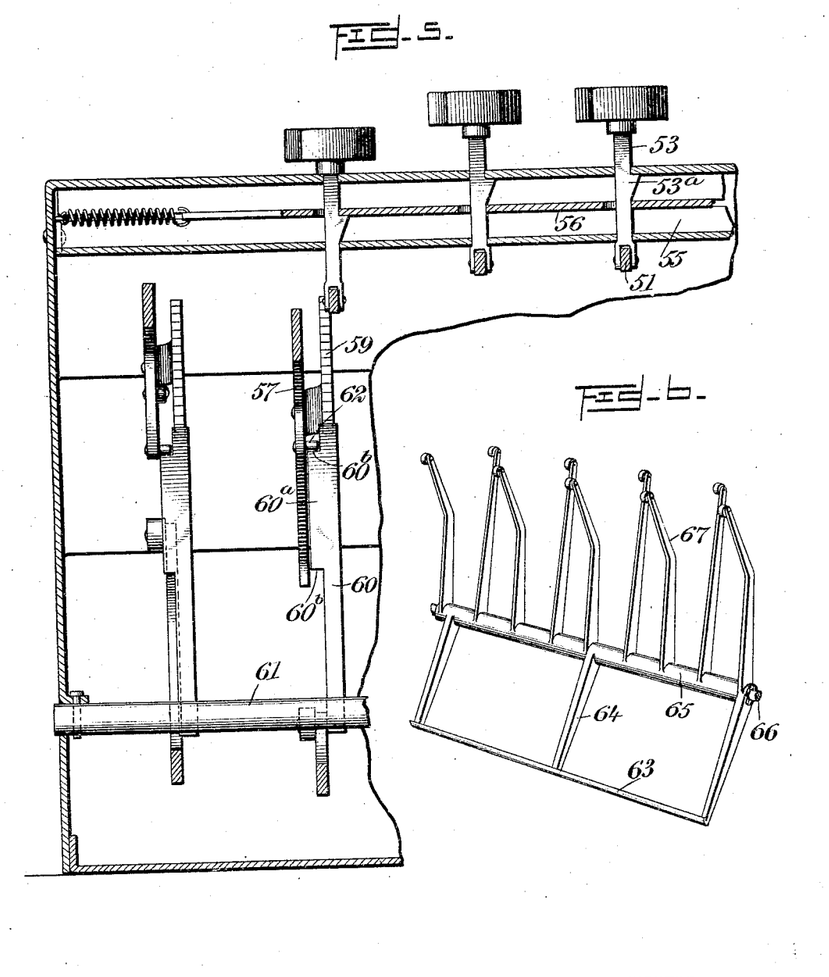
Fig. 5 is a fragmentary cross-section on the line 5 5 of Fig. 2.
Fig. 6 is a detail perspective of the lock device for preventing excessive movement of the indicating-wheels.

Since each main key-lever 57 has a cam 57$^b$ of characteristic form, and since the desired operation of the indicating-wheel is dependent upon these devices, it is essential that in operation each main key-lever should be depressed to the end of its downward movement. To insure this, I provide each lever with a ratchet 59. Coacting with each ratchet is a spring-hook 60, these hooks being carried by a suitable supporting-bar 61. The hooks are provided with laterally-widened portions 60$^a$, terminating in shoulders 60$^b$, respectively, at the upper and lower extremities of the widened portions. (See Fig. 5.) With these widened portions pins 62, carried by the levers 57, coact. The parts normally assume the position shown in Figs. 2 and 5, in which the face of the ratchet 59 lies out of the line of the bill of the hook 60. When one of the main levers 57 is depressed, the pin 62 of each lever runs along the diagonally-disposed hook 60 and presses the same into engagement with the ratchet 59, the pin 62 engaging the widened portion 60$^a$ of said hook. This operation continues until the lever is depressed sufficiently to run the pin 62 off of the widened portion 60$^a$ past the lower shoulder 60$^b$ thereof. The hook 60 will then swing back to its normal position clear of the ratchet 59. This releases the ratchet and permits the return of the lever to which the ratchet is attached. The widened portions 60ª of the hooks 60 are of a length corresponding precisely to the full throw of the levers 57, and it will be seen, therefore, that should a lever be depressed but part of its throw it cannot be released until it is wholly depressed, and this insures full movement of the main key-levers upon each operation thereof. In order to prevent the indicating-wheels from receiving excessive turning movement—that is, turning by momentum—I provide a locking device. (Best shown in Figs. 2 and 6.) This comprises a lock-bar 63, which coacts with the teeth 23 of the indicating-wheels and when raised into engagement therewith will prevent the turning of the wheels. Said lock-bar 63 is carried by arms 64, projecting from the rocker-sleeve 65, mounted on a transverse shaft 66, located just below the pivot 47 of the swinging member 46. Projecting forward from the rocker-sleeve 65 are a number of arms 67, corresponding to the main key-levers 57 and so disposed as to be engaged by heel-like portions 57°, formed on said levers, the arrangement being such that this engagement does not take place until the instant that the key-levers reach the end of their movement. Consequently when one of the levers is depressed it performs the necessary operation and then engages its corresponding arm 67, turning up the lock-bar 63 and preventing idle movement of the indicating-wheels.

In the use of the apparatus the parts are adjusted as shown, and the main keys 58 are manipulated with the keys 54, so that any one of the main keys may be made to impart to any one of the indicating-wheels a turn exactly commensurate to the value of the major numeral produced on the main key being operated. The cut-out keys 41 may be actuated from time to time to cut out of operation any one of the transmitting devices, so as to prevent carrying from one indicating-wheel to the other, this latter operation being necessary in performing some calculations—for instance, in subtraction and division. The action of the machine in calculating is similar to that of machines heretofore devised in this class and will, it is believed, be understood from the prior art. For example, addition is carried on by the simple process of striking the various main keys bearing the numbers to be added, operating the keys 54 meanwhile, and leaving in operation the transmitting devices, so that results will be carried from one indicating-wheel to the other, as is usual in numbering mechanism. Multiplication is carried on by first operating the machine to show the multiplicand through the openings 15ª and then striking each main key 58 bearing in major characters the number or numbers of the multiplier a number of times corresponding to the numbers of the multiplicand. With the example two hundred and twenty-two multiplied by four the procedure is as follows: "222" is first indicated in the machine, and then the main key bearing the major number "4" is connected with the units indicator-wheel and operated twice. It is then connected with the tens indicating-wheel and operated twice, and then finally connected with the hundreds indicating-wheel and operated twice, producing the result "888."

Subtraction is carried on by first indicating on the machine the minuend and then subtracting one from the subtrahend and striking the main key or keys 58 bearing the subtrahend in minor numbers, connecting these main keys with the units, tens, hundreds, &c., indicating-wheels, according to the numbers of the minuend, and disconnecting each of the transmitting devices by operating keys 41 as may be necessary to prevent carrying from one indicating-wheel to the other. Thus with the example fourteen minus six "14" should be indicated in the usual manner, and "1" should be subtracted from the subtrahend "6," making the subtrahend used in the calculation "5." Then the main key 58 bearing the minor number "5" should be coupled with the units indicating-wheel and then depressed.

In dividing, the amount of the dividend is placed on the machine by striking the keys 58 according to the large figures thereon. Then the divisor is struck according to the small figures on the keys 58, as follows: In the fewest figures at the left of the dividend which exceed the divisor and which are first to be divided there is usually one more figure than the divisor contains, and this extra figure at the left of the corresponding order of figures of the divisor indicates how many times the divisor (less one) should be struck on keys 58 according to the small figures thereon. For example, in six hundred and forty-one divided by sixty-eight the figure "6" in the dividend indicates that the divisor is to be struck six times. If the indicating-figure should have one or more added to it while the divisor is being struck, then the divisor (less one) should be struck the additional number of times corresponding to the amount added to the indicating-number, if any has been added to it.

Having thus described the preferred form of my invention, what I claim as new, and desire to secure by Letters Patent, is—

1. A calculator comprising a case, a plurality of indicating devices therein, means for transmitting from one indicating device to the other, means for throwing the transmitting means out of operation at will, keys located outside of the case and connected with said means, means for operating the indicating device, keys in connection with the operating means and projecting outside of the case, and means for connecting the operating means with the indicating devices, and keys in connection with the last-named means and projecting outside of the case.

2. A calculator comprising a case, indicating devices therein, means for transmitting from one indicating device to the other, means for throwing the transmitting device out of action at will, keys in connection with the last-named means, operating means for the indicating devices, keys for the operating means, the keys projecting outside of the casing, means for connecting any one of the operating means with any one of the indicating devices, and keys for said connecting means, the keys projecting outside of the casing.

3. In a calculating-machine, the combination of a plurality of indicating devices, a plurality of operating members, a swinging member adapted to be moved by said operating members, devices in connection with the swinging member and respectively coacting with the indicating means, and means for throwing said devices in and out of action.

4. In a calculating-machine, the combination of a plurality of indicating devices, a plurality of operating members having cams thereon, a movable member engaged with and operated by said cams, means for operating the indicating devices, said means being connected with said movable member, and means for throwing the means for operating the indicating devices in and out of action at will.

5. In a calculating-machine, the combination of an indicating device, a ratchet in connection therewith, a ratchet-bar coacting with the ratchet, a movable member connected with the ratchet-bar, a swinging lever having a cam engaging the movable member, and means for moving said ratchet-bar in and out of action at will.

6. In a calculating-machine, the combination of a plurality of indicating devices, an operating means for each, devices for throwing the operating means in and out of action independently of each other, a movable member with which said operating means are connected, and devices for imparting variable movement to said movable member, said devices comprising swinging levers having unlike cams thereon engaged with said movable member.

7. In a calculator, the combination of a plurality of indicating devices, a ratchet in connection with each, a ratchet-bar coacting with each ratchet, means for moving the ratchet-bars in and out of action independently of each other, a movable member in connection with the ratchet-bars, and means for imparting variable movement to said movable member.

8. In a calculator, the combination of a plurality of indicating devices, a ratchet in connection with each, a ratchet-bar coacting with each ratchet, means for moving the ratchet-bars in and out of action independently of each other, a movable member in connection with the ratchet-bars, and means for imparting variable movement to said movable member, said means for imparting variable movement to the movable member comprising a plurality of levers having unlike cams thereon.

9. In a calculator, the combination of a plurality of indicating devices, means for operating each, a key-actuated means for throwing the operating means in and out of action independently of each other, a movable member in connection with said operating means, a key-operated means for imparting variable movement to said movable member, means for transmitting from one indicating device to the other, and devices for throwing said transmitting means in and out of action at will.

10. In a calculator, the combination of a plurality of indicating devices, an operating means for each, devices including a key for moving the operating means in and out of action independently of each other, each of said devices also including an incline shouldered part, a sliding lock coacting with the said incline shouldered parts, means for yieldingly pressing the lock in one direction, a movable member in connection with the indicating devices, operating means, and means for imparting a variable movement to said movable member.

11. In a calculator, the combination of a plurality of indicating devices, means for transmitting from one to the other, devices for throwing said transmitting means in and out of action at will, said devices including key-operating parts having inclined projections, a sliding lock coacting with said projections, and means yieldingly pressing the lock in one direction.

12. In a calculating-machine, the combination of a plurality of indicating devices, a movable member, devices in connection with the movable member and adapted respectively to operate the indicating devices, means for throwing out of action any one of said devices in connection with the movable member, and a plurality of operating-keys having unlike cams adapted to engage the movable member.

13. In an indicating-machine, the combination of a plurality of indicating devices, means for transmitting from one to the other, a movable member, ratchet-bars carried by the movable member, ratchets in connection with the indicating devices and respectively coacting with the ratchet-bars, means for throwing any one of the ratchet-bars out of action at will, and means for imparting variable movement to said movable member.

14. In an indicating-machine, the combination of a plurality of indicating devices, means for transmitting from one to the other, a movable member, ratchet-bars carried by the movable member, ratchets in connection with the indicating devices and respectively coacting with the ratchet-bars, means for throwing any one of the ratchet-bars out of action at will, and means for imparting variable movement to said movable member, said means comprising operating-keys having unlike cams thereon engaging the said movable member.

15. In a calculating-machine, the combination of a plurality of indicating devices, means for operating the same, means for transmitting from one indicating device to the other for the purpose specified, a key-actuated rod coacting with the second-named means to throw the same out of action, and a sliding lock-plate adapted to engage a part of said rod to hold it in active position.

16. In a calculator the combination of a plurality of indicating devices, means for transmitting from one to the other, a movable member, keys having unlike cams thereon adapted to impart unlike movements to the said member, normally inactive operating devices in connection with said member and respectively adapted to operate the indicating devices and keys for independently throwing said operating devices into action at will.

17. In a calculator the combination of a plurality of indicating devices, means for transmitting from one to the other, means for throwing the transmitting means out of action at will, a movable member, keys having unlike cams thereon adapted to impart unlike movements to the said member, normally inactive operating devices in connection with said member and respectively adapted to operate the indicating devices and keys for independently throwing said operating devices into action at will.

18. In a calculator the combination of a plurality of indicating devices, means for transmitting from one to the other, a ratchet in connection with each indicating device, a normally inactive ratchet-bar coacting with each ratchet, keys for independently throwing the ratchet-bars into action, a movable member to which the ratchet-bars are connected, and keys having unlike cams thereon adapted to act on and impart unlike movements to said movable members.

19. In a calculator the combination of a plurality of indicating devices, means for transmitting from one to the other, means for throwing the transmitting means out of action at will, a ratchet in connection with each indicating device, a normally inactive ratchet-bar coacting with each ratchet, keys for independently throwing the ratchet-bars into action, a movable member to which the ratchet-bars are connected, and keys having unlike cams thereon adapted to act on and impart unlike movements to said movable members.

20. In a calculator the combination of a plurality of indicating devices, means for transmitting from one to the other, keys for throwing the transmitting means out of action at will, a ratchet in connection with each indicating device, a normally inactive ratchet-bar coacting with each ratchet, keys for independently throwing the ratchet-bars into action, a movable member to which the ratchet-bars are connected, and keys having unlike cams thereon adapted to act on and impart unlike movements to said movable members.

21. In a calculator, the combination of a plurality of indicating devices, means for transmitting from one to the other, means for throwing the transmitting means in or out of action at will, a swinging member, devices in connection therewith for operating the indicating devices, means for throwing the operating devices into or out of action, and means for variably operating the said swinging member.

In testimony whereof I have signed my name to this specification in the presence of two subscribing witnesses.

FRANK W. BENNETT.

Witnesses:
FRANCIS P. GUILFOILE,
HOWARD BAKER.